Fig.1

UNITED STATES PATENT OFFICE.

HUBERT A. MYERS, OF TOLEDO, OHIO, ASSIGNOR TO TOLEDO SCALE COMPANY, OF TOLEDO, OHIO, A CORPORATION OF NEW JERSEY.

MULTIPLE INDICATING MECHANISM FOR WEIGHING-SCALES.

1,243,676.     Specification of Letters Patent.     Patented Oct. 16, 1917.

Application filed September 22, 1915. Serial No. 51,931.

*To all whom it may concern:*

Be it known that I, HUBERT A. MYERS, a citizen of the United States, residing at Toledo, in the county of Lucas and State of Ohio, have invented certain new and useful Improvements in Multiple Indicating Mechanism for Weighing-Scales, of which the following is a specification.

This invention relates to weighing scales, and more particularly to multiple weight indicating devices whereby the weight of a load being weighed upon the scale may be simultaneously indicated at a plurality of places remote from the weighing scale. The primary object of the invention is to provide a simple and efficient multiple weight indicating device that can be utilized in conjunction with weighing scales of the pendulum type, and so constructed and arranged upon the scale that the accuracy of the weighing mechanism will be in no way be impaired.

A further object is to provide a multiple weight indicating device operated through the medium of electricity, and wherein several indicator dials remote from the weighing scale may be connected in series for simultaneous operation.

Another object is to provide a multiple weight indicating mechanism that can be manufactured separately from and as an auxiliary to the weighing mechanism of a scale, and which can be readily affixed in operative position upon a scale, and as readily detached therefrom.

With the above and other objects in view which will readily appear from the following description, my invention consists of the novel construction, combination and arrangement of elements to be hereinafter fully described, illustrated in the accompanying drawings, and particularly pointed out in the subjoined claims.

Reference is to be had to the accompanying drawings illustrating a preferred embodiment of my invention, and in which similar reference characters designate similar parts throughout the several views.

Referring to the drawings, 5 designates a scale housing adapted to inclose the load-offsetting or counterbalancing mechanism of a weighing scale and supported upon the upper extremity of a suitable column 6, the lower end of which is associated with the base (not shown) of the scale inclosing the usual platform lever mechanism supporting the scale platform (not shown). It is to be understood that any suitable platform and platform lever mechanism may be employed in connection with the weighing or load-counterbalancing mechanism of the scale, and that the weighing mechanism of the scale may be of any approved type, various mechanisms well known in the scale art being fully capable of performing the required functions. The embodiment herein illustrated is one that has been found to successfully demonstrate the capabilities of this invention, and shows a double pendulum scale of a well-known type adapted to be suitably connected with the platform lever mechanism of the scale so that upon the placing of a load upon the scale platform the pendulums will be moved into a position counterbalancing the weight of the load on the platform. Inasmuch as the present invention is not dependent for its operation upon any particular form of scale mechanism, no attempt is made in this application to show a complete scale mechanism, nor to delineate the action of the scale in its load-counterbalancing or weighing operations; only so much of the scale mechanism being shown as is necessary to clearly portray the operation and co-action of the multiple weight indicating mechanism associated with the scale mechanism and forming the claimed invention herein disclosed.

Figure 1:
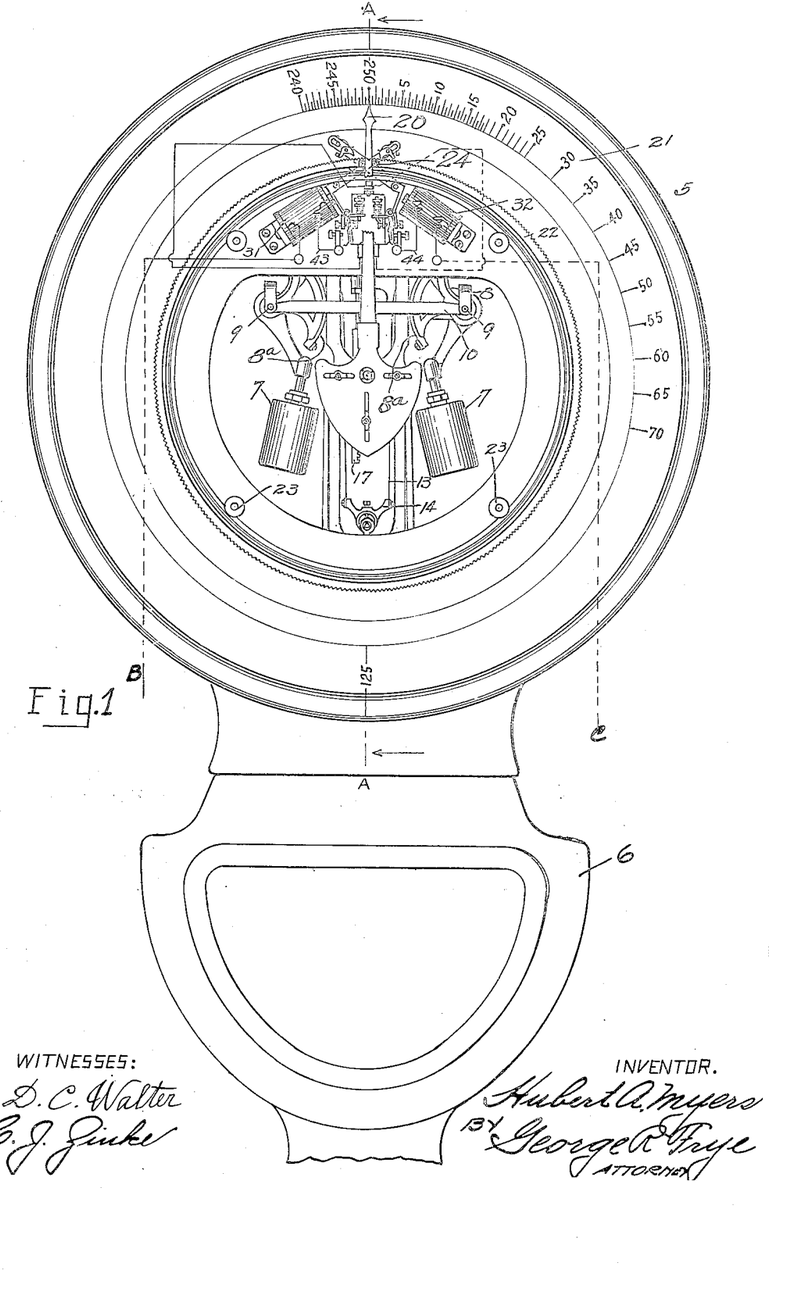
Figure 1 is a front elevation of the upper part of a weighing scale equipped with my improved mechanism for transmitting the indications shown upon the scale.

As herein shown, the pendulum load-counterbalancing mechanism comprises a pair of oppositely-disposed pendulums 7, each of which comprises supporting segments 8 secured upon transverse shafts 9, and the two shafts are connected together by crossbars 10, the segments 8 being suspended upon the lower ends of flexible supporting ribbons 8ª secured at their opposite ends upon the framework of the scale. Intermediate the supporting segments of each pendulum is a somewhat larger segment 11, which is also fixed to the transverse shaft 9, said segment extending at its periphery between the pillars of the framework supporting the segments 8 and is connected at its upper end, as at 12, to a flexible metallic ribbon 13 which extends over the arcuate face of the segment and is attached at its lower end to an equalizer bar 14. The construction of the two pendulums is substantially identical, and the ribbons 13 are connected to opposite sides of the equalizer bar 14, as shown in Fig. 1, which is pivotally connected as by the link 15 (see Fig. 2), which in turn is connected, as by the steelyard 16, to the platform lever mechanism of the scale, the construction and arrangement being such that whenever a load is placed upon the scale platform, a downward pull is exerted upon the equalizer bar 14, which is transmitted through the ribbons 13 to the larger segments 11, causing the swinging of the pendulums so that the pendulum weights are raised to a position counterbalancing the weight of the load on the platform. During the swinging movement of the pendulums to offset the weight of the load, the crossbars 10 are moved vertically upward, and through the medium of this vertical movement of the crossbars the weight indication of the scale is effected, the crossbars 10 carrying a vertically-disposed rack 17 meshing with a pinion 18 fixed upon the indicator shaft 19 carrying the indicator hand 20, which is formed of iron or other magnetic metal. The indicator shaft 19 is mounted concentrically of the dial 21 having the weight graduations suitably inscribed thereon, with which graduations the indicator hand 20 is adapted to coact in indicating the weight of a load being weighed upon the scale platform.

The particular scale mechanism shown and described herein is substantially in accordance with that described and claimed in the patent to Hapgood, No. 1,203,611, issued Nov. 7, 1916.

Figures 2, 3, 6, 7, 10:
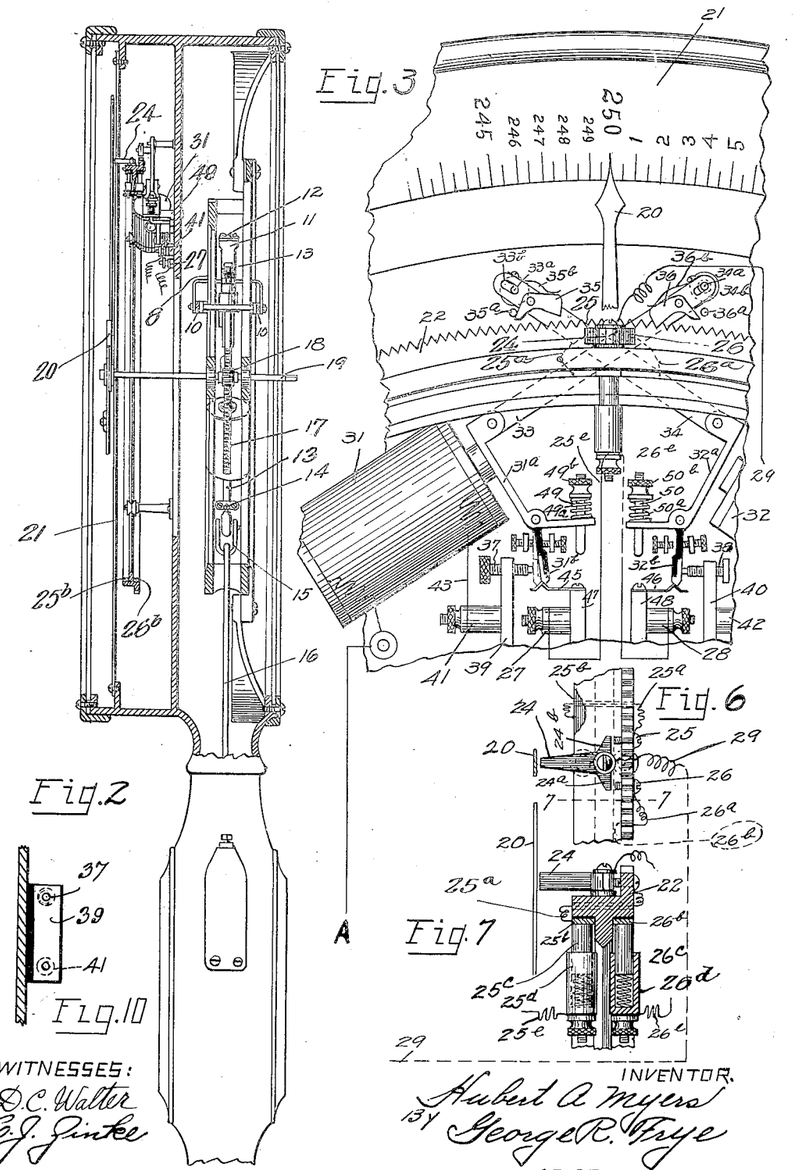
Fig. 2 is a vertical section taken substantially on the line A—A of Fig. 1.
Fig. 3 is an enlarged detail elevation of the transmitting mechanism.
Fig. 6 is an enlarged plan view of details to be hereinafter described.
Fig. 7 is a detail sectional view taken on the line 7—7 of Fig. 6.
Fig. 10 is a detail of binding posts 39 and 40 hereinafter described.

The means for simultaneously indicating upon indicator dials situated at various distances from the scale proper will now be described. A toothed ring 22 is revolubly mounted upon rollers 23 and carries a permanent magnet 24, pivoted as illustrated in Fig. 6 adjacent a pair of spaced binding posts 25 and 26 respectively, which binding posts are connected, as by the wires 25ª and 26ª, with spaced metallic conducting rings 25ᵇ and 26ᵇ mounted upon the lower face of the ring 22, and insulated therefrom. The conducting ring 25ᵇ is preferably arranged adjacent the forward edge of the toothed ring 22, as shown in Fig. 7, and is contacted by the spring-pressed metallic contact member 25ᶜ telescopically arranged within a vertically-disposed cup 25ᵈ supported upon the framework of the scale, the cup 25ᵈ being connected, as by the wire 25ᵉ, with the binding post 27 (see Fig. 3). The metallic conducting ring 26ᵇ is arranged adjacent the rear edge of the toothed ring 22, and is similarly contacted by the spring-pressed metallic contact member 26ᶜ telescopically arranged within a vertically-disposed cup 26ᵈ, supported upon the framework of the scale, the cup 26ᵈ being connected, as by the wire 26ᵉ, with the binding post 28. The magnet 24 is preferably shaped as shown in Fig. 6, and is provided with a forwardly projecting member or nose adapted to extend to within a short distance of the indicator hand 20 of the scale, and is also provided with laterally-extending contact members adapted to make contact with the binding posts 25 and 26 respectively in the operation of the multiple indicating mechanism, as will be hereinafter described. The magnetic member 24 is connected, as by means of the wire 29, with the battery 30, or other source of current, one extremity of the wire 29 being shown as extending from the member 24 in Figs. 3 and 6 of the drawings, and the other extremity of the wire 29 being shown as connected with the batteries 30 in Fig. 4 of the drawings.

A pair of electro-magnets 31 and 32 are arranged on the framework of the scale substantially as shown in Figs. 1 and 3, and when energized are adapted to attract the armatures 31ª and 32ª respectively, which are preferably formed as three-armed levers, and pivoted at the junction of the lever arms, as clearly shown in Fig. 3. The longest arms of the armatures 31ª and 32ª are arranged adjacent the poles of the electro-magnets 31 and 32, and at their free ends are pivotally connected with the lower ends of diagonally-disposed slide-bars 33 and 34 respectively arranged to be reciprocated upon the swinging movement of the armatures 31ª and 32ª, and guided in their reciprocating movements by guide-pins 33ª and 34ª extending into elongated slots 33ᵇ and 34ᵇ, arranged in the slide-bars adjacent their upper extremities. The slide-bars 33 and 34 respectively carry pivoted pawls 35 and 36 arranged to co-act with the teeth of the toothed ring 22, as clearly shown in Figs. 1 and 3, the pawls being formed substantially as bell-crank levers with one arm arranged to fit into the serrations in the ring 22, and the other arm arranged at an angle thereto and adapted to be contacted by pins 35$^a$ and 36$^a$ extending from the framework of the scale. The pawls are normally pressed down into contact with the toothed ring 22, by means of leaf-springs 35$^b$ and 36$^b$.

A second arm of each of the three-armed armatures 31$^a$ and 32$^a$ carries a contact plate 31$^b$ and 32$^b$ insulated from the armatures, these contact plates being arranged to engage the adjustable contact screws 37 and 38 threaded into the metallic brackets 39 and 40 carried by and insulated from the framework of the scale, Fig. 10, which brackets also carry the binding posts 41 and 42 connected, as by the wires 43 and 44, with the wires forming the windings of the electromagnets 31 and 32 respectively. The lower ends of the contact plates 31$^b$ and 32$^b$ are preferably inclined, as shown in Fig. 3 and are adapted to engage the inclined projections upon the resilient contact members 45 and 46 secured upon the metallic brackets 47 and 48, which also carry the binding posts 27 and 28 hereinbefore mentioned as being connected through the medium of the wires 25$^e$ and 26$^e$ with the spring-pressed contact members 25$^c$ and 26$^c$ respectively engaging the conducting rings 25$^b$ and 26$^b$ upon the toothed ring 22.

The third arm of each of the three-armed armatures 31$^a$ and 32$^a$ is apertured, and loosely surrounds the upwardly-extending pins 49 and 50 carried by the framework of the scale, the upper faces of said arms being engaged by the lower extremities of the coil springs 49$^a$ and 50$^a$, the other extremities of said springs engaging the lower faces of the adjusting nuts 49$^b$ and 50$^b$ threaded upon the upper extremities of the pins 49 and 50.

The operation of the multiple indicating mechanism so far described will now be given. When a load is placed upon the scale platform the pendulums 7 are swung upwardly as hereinbefore described, causing the upward movement of the rack 17 connected with the crossbars 10 carried by the pendulums so as to rotate the pinion 18 upon the indicator shaft 19, and with it the indicator hand 20. As soon as the indicator hand 20 begins its movement to indicate upon the dial the weight of the load, the permanent magnet 24, which previously had been immediately behind the indicator hand as shown in the drawings, would be swung on its pivot because of the attraction exerted by the magnet on the metallic indicator hand, the magnet following the indicator hand in its movement until said hand has moved beyond the magnetic field of the magnet, at which time the magnet 24 will have been swung on its pivot to a position in which one of its lateral arms 24$^a$ or 24$^b$ will have been moved into contact with one of the binding posts 25 or 26. As shown in the drawings, the rotation of the indicator hand from zero to a weight indication is in a clockwise direction, and the magnet 24 in attempting to follow the indicator hand in this movement will swing the lateral arm 24$^a$ (see Fig. 6) into engagement with the contact post 26, which will serve to complete a circuit to energize the electro-magnet 32. This circuit includes the wire 29 leading from the batteries or other source of current to the magnet 24, the current flowing thence through the binding post 26 and wire 26$^a$ to the conducting ring 26$^b$ which is contacted by the spring-pressed contact member 26$^c$ from which contact member the wire 26$^e$ leads to the binding post 28 electrically connected with the resilient contact 46, which in turn engages the contact plate 32$^b$ upon one arm of the pivoted armature 32$^a$. Since in its normal position—i. e., when the scale is at rest—the contact plate 32$^b$ is in contact with the adjustable contact screw 38 the current is free to pass through this contact screw 38, the metallic bracket 40, binding post 42 and wire 44 to the winding of the electro-magnet 32, the circuit being completed through a series of multiple indicating devices to be hereinafter described, and the battery 30.

Upon the closing of the circuit the electro-magnet 32 attracts the pivoted armature 32$^a$ reciprocating the slide-bar 34, throwing it from the position shown in Fig. 3 to its other extreme position (such as is shown by the slide-bar 33 in Fig. 3) wherein the pawl 35 engages a tooth in the toothed ring 22, and rotates this ring a distance corresponding to the pitch of the teeth, the teeth being spaced a radial distance proportional to the distance between the graduations inscribed upon the dial 21 so that there is one tooth upon the ring 22 in radial alinement with each graduation mark upon the dial 21. As the armature 32$^a$ is swung inwardly against the pole of the electro-magnet, the contact plate 32$^b$ carried upon the second arm of the armature is swung out of engagement with the contact screw 38, thereby breaking the circuit, deënergizing the magnet 32, and allowing the armature 32$^a$ to be swung to its original position under the impulse of the coil spring 50$^a$ engaging the third arm of the three-armed armature 32$^a$. This swinging of the armature to its original position again completes the circuit through the electro-magnet 32, since it again moves the contact plate 32$^b$ into engagement with the contact screw 38, thereby again reciprocating the slide-bar 34 so as to rotate the ring 22 a distance corresponding to the width of another tooth, the circuit being again broken upon this reciprocation to allow the armature and slide-bar to be returned to their original positions. This alternate make and break of the circuit through the contact plate 32$^b$ in accordance with the swinging movement of the armature 32$^a$ continues as long as the lateral arm 24$^a$ of the permanent magnet 24 remains in contact with the binding post 26, the ring 22 being advanced a distance corresponding to the width of each tooth at each reciprocation of the slide-bar, the ring 22 and the magnet 24 carried thereby being rotated until the pivoted magnet 24 again alines with the metallic indicator hand 20, which occurs when the magnet 24 moves into a position so close to the indicator hand that its magnetic field will be exerted to attract the indicator hand.

As the magnet 24 alines with the indicator hand in its new position the lateral arm 24$^a$ is swung away from the binding post 26, breaking the circuit and deënergizing the electromagnet 32 so that no further reciprocations of the slide-bar 34 may then be effected. Should the momentum of the ring 22 in its advance movement carry it beyond the position of the indicator hand 20 the pivoted magnet 24 will be swung into its alining position and then around in the opposite direction as the ring and magnet pass the metallic indicator hand, thereby throwing the lateral arm 24$^b$ into engagement with the other binding post 25, whereby a circuit is completed to energize the other electromagnet 31 to reciprocate the other slide-bar 33 and rotate the ring 22 in the reverse direction, returning it to a position in alinement with the indicator hand. Similarly, whenever the load being weighed is removed from the scale platform the fall of the pendulums 7 will effect a rotation of the indicator hand 20 to return it to its normal or zero position, and in this return movement the magnet 24 is swung on its pivot until the lateral arm 24$^b$ contacts with the binding post 25 completing a circuit whereby the slide-bar is reciprocated to rotate the ring 22 until the magnet 24 again alines with the indicator hand in its zero position.

Figures 4, 5:
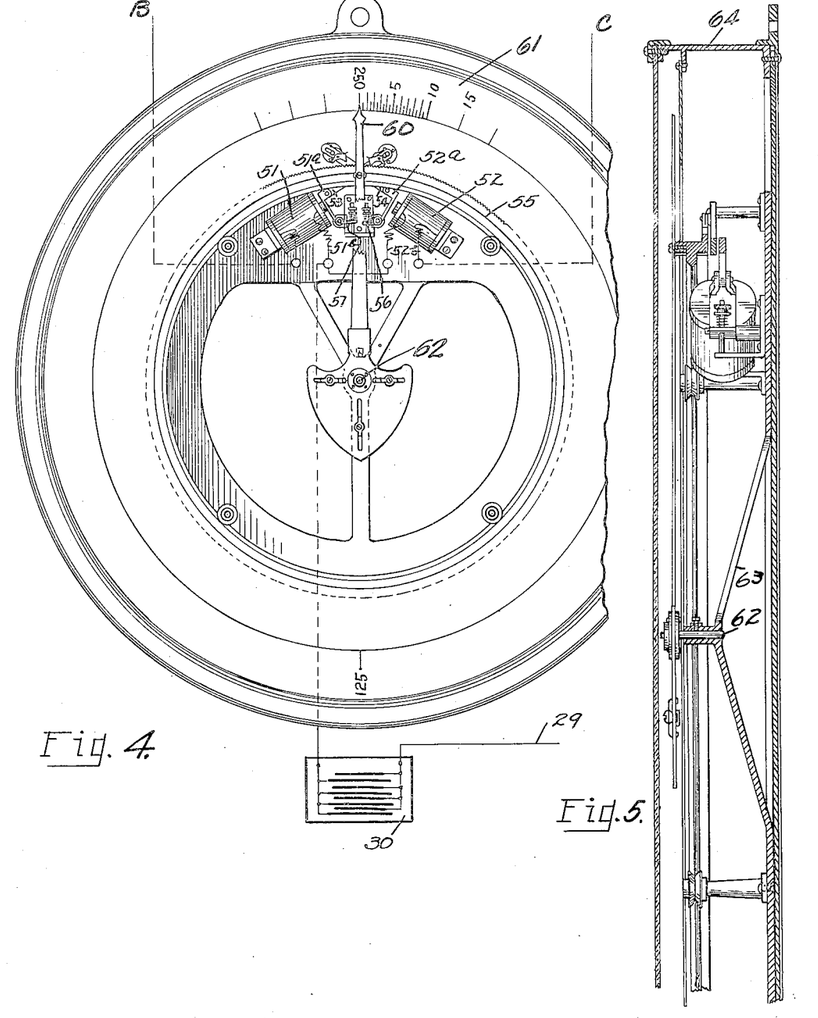
Fig. 4 is a front elevation of an indicator dial equipped with my improved mechanism for indicating on the dial the weights shown on the weighing scale.
Fig. 5 is an enlarged vertical section taken substantially on a plane passing through the center of the mechanism shown in Fig. 4.
Figure 8:
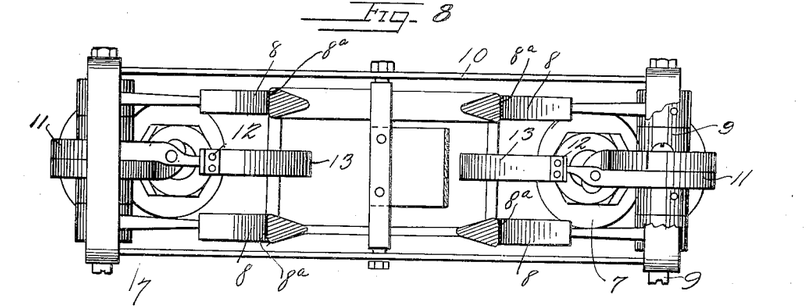
Fig. 8 is a horizontal section through the weighing mechanism.
Figure 9:
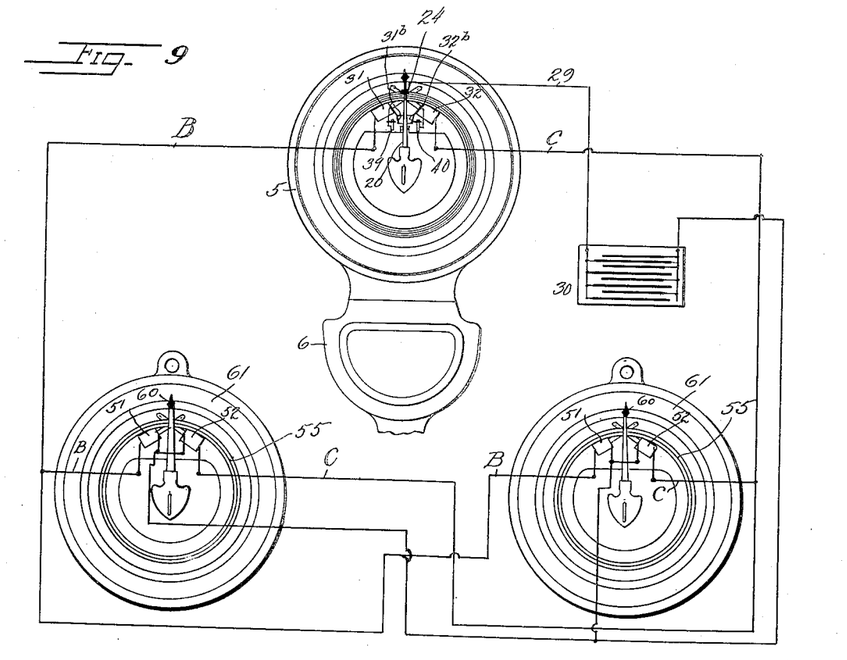
Fig. 9, a diagrammatic view showing connections for operating multiple indicating devices.

Means are provided for indicating the movements of the indicator hand 20 around its dial 21 on one or more similarly-marked indicator dials, Fig. 9, situated at any desired distance from the scale proper, by arranging a pair of electro-magnets 51 and 52 adjacent each of such auxiliary dials 61, substantially as shown in Fig. 4 of the drawings, and connecting these electro-magnets in series with the electro-magnets 31 and 32 respectively, thereby insuring the attraction of the pivoted armatures 51$^a$ and 52$^a$ in conformity with the attraction of the armatures 31$^a$ and 32$^a$ hereinbefore described, and allowing slide-bars 53 and 54 respectively connected to the armatures 51$^a$ and 52$^a$ to be reciprocated simultaneously with the slide-bars 33 and 34 to rotate the toothed ring 55 coincidently with the toothed ring 22. The construction and arrangement of the slide-bars 53 and 54 for reciprocating movement and for imparting rotative movement to the ring 55 in opposite directions is substantially identical with the construction and arrangement of the slide-bars 33 and 34 hereinbefore described, and the armatures 51$^a$ and 52$^a$ are pivotally connected to the inner ends of the slide-bars 53 and 54, as shown. Since there is no necessity for maintaining a separate make and break mechanism upon the duplicate or multiple indicating mechanism, the armatures 51$^a$ and 52$^a$ are formed merely as two-armed or bell-crank levers, one of the arms of each being connected with the trip levers 53 or 54, and the other arm being engaged by the lower extremity of a coil spring 56 or 57 surrounding upwardly-extending pins 56$^a$ and 57$^a$ and engaged at their upper extremities by adjusting nuts. The indicator hand 60 utilized in the duplicate or multiple indicating mechanism is secured directly to the toothed ring 55, as clearly shown in Fig. 4, thus enabling the omission of the permanent magnet and insulated conducting rings utilized in the transmitting mechanism hereinbefore described in connection with the weighing scale. The indicator hand 60 is pivoted upon a stub shaft 62 mounted concentrically of the dial 61 upon a framework 63 secured to the housing 64 of the auxiliary indicating mechanism, as shown in Figs. 4 and 5. The wiring connections whereby the electro-magnets 51 and 52 are energized simultaneously with the electro-magnets 31 and 32 comprise a wire B directly connecting the winding of the electro-magnet 51 with the electro-magnet 31, and a similar wire C directly connecting the winding of the magnet 52 with the magnet 32, a portion of the wires B and C adjacent the magnets 31 and 32 being shown in Fig. 1, and the portions of the wires B and C adjacent the magnets 51 and 52 being shown in Fig. 4. Wires 51$^b$ and 52$^b$ leading respectively from the opposite ends of the windings of the magnets 51 and 52 are connected, substantially as shown in Fig. 4, with the batteries 30 or other source of current. Should more than one auxiliary indicating dial be employed, the wires connecting the electro-magnets of the other indicating devices would be directly connected with the wires of the electro-magnets 31 and 32, substantially as are the electro-magnets 51 and 52. It is to be understood that each of the auxiliary indicating devices is substantially identical with the indicating device illustrated in Figs. 4 and 5 of the drawings, and the illustration and detail description of this auxiliary indicating device will suffice for a description of all the multiple indicating devices.

Since the armatures of the electro-magnets of each of the multiple indicating devices will be attracted simultaneously with the attractions of the armatures of the electro-magnets 31 and 32 adjacent the dial and indicating hand of the weighing scale, and all of the armatures are pivotally connected with substantially identical slide-bars carrying pawls engaging the teeth of the identical rotatable rings, it will be evident that each of the rotatable rings of the auxiliary indicating devices will be rotated coincidently with the rotation of the toothed ring 22 adjacent the dial of the weighing scale, so that the weight shown by the indicator hand 20 of the weighing scale will be simultaneously shown upon each of the multiple indicating devices, regardless of their distance from the scale proper.

While it will be apparent that the illustrated embodiment of my invention is well calculated to adequately fulfil the objects of the invention primarily stated, it will be understood that the construction is susceptible to modification and change without departing from the spirit and scope of the invention as set forth in the following claims.

Having described my invention, I claim:

1. In a device of the class described, a weighing scale, and means for indicating at a distance from the scale the weight of a load weighed upon the scale, including a graduated dial, a rotatable member, an indicator carried thereby and movable over the dial, and means for rotating said member step by step proportionally with the displacement of the weighing mechanism of the scale.

2. In a device of the class described, a weighing scale, and means for indicating at a distance from the scale the weight of a load weighed upon the scale, including a graduated dial, a rotatable member, an indicator carried thereby and movable over the dial, and electro-magnetic means for rotating said member step by step proportionally with the displacement of the weighing mechanism of the scale.

3. In a device of the class described, a weighing scale, and electro-magnetic weight-transmitting means arranged adjacent the weighing mechanism of the scale for indicating at a distance from the scale the weight of a load weighed upon the scale, including a graduated dial, a rotatable member, an indicator carried thereby and movable over the dial, and electromagnetic means for rotating said member proportionally with the displacement of the weighing mechanism of the scale.

4. In a device of the class described, a weighing scale having an indicator hand, electro-magnetic weight-transmitting means arranged adjacent the indicator hand for indicating at a distance from the scale the weight of a load weighed upon the scale, including a graduated dial, a rotatable member, an indicator carried thereby and movable over the dial, and electro-magnetic means for rotating said member proportionally with the displacement of the indicator hand.

5. In combination with a weighing scale, means for indicating at distances from the scale the weight of a load weighed upon the scale, including a rotatable member mounted adjacent the weighing mechanism of the scale and adapted to be rotated through an arc proportional to the displacement of the weighing mechanism, a graduated dial remote from the scale, a second rotatable member mounted adjacent the dial, an indicator carried thereby and movable over the dial, and means for rotating both rotatable members in unison.

6. In combination with a weighing scale, means for indicating at a distance from the scale the weight of a load weighed upon the scale, including a rotatable member mounted adjacent the weighing mechanism of the scale and adapted to the rotated through an arc proportional to the displacement of the weighing mechanism, a graduated dial remote from the scale, a second rotatable member mounted adjacent the dial, an indicator carried thereby and movable over the dial, and electrically-actuated means for rotating both rotatable members in unison.

7. In combination with a weighing scale, means for indicating at a distance from the scale the weight of a load weighed upon the scale, including a rotatable member mounted adjacent the weighing mechanism of the scale and adapted to be rotated through an arc proportional to the displacement of the weighing mechanism, a graduated dial remote from the scale, a second rotatable member mounted adjacent the dial, an indicator carried thereby and movable over the dial, and electro-magnetic means arranged adjacent each of said rotatable members for rotating both rotatable members in unison.

8. In combination with a weighing scale, means for indicating at a distance from the scale the weight of a load weighed upon the scale, including a rotatable member mounted adjacent the weighing mechanism of the scale and adapted to be rotated through an arc proportional to the displacement of the weighing mechanism, a graduated dial remote from the scale, a second rotatable member mounted adjacent the dial, an indicator carried thereby and movable over the dial, and electro-magnetic means arranged adjacent each of said rotatable members for rotating both rotatable members in unison, said means including reciprocating members arranged to engage said rotatable members and simultaneously movable to rotate said members in unison.

9. In combination with a weighing scale, means for indicating at distances from the scale the weight of a load weighed upon the scale, including a rotatable member mounted adjacent the weighing mechanism of the scale and adapted to be rotated through an arc proportional to the displacement of the weighing mechanism, a plurality of graduated dials remote from the scale, a rotatable member mounted adjacent each of said dials, an indicator carried thereby and movable over the dial, and means for rotating all of said rotatable members in unison.

10. In combination with a weighing scale, means for indicating at distances from the scale the weight of a load weighed upon the scale, including a rotatable member mounted adjacent the weighing mechanism of the scale, and adapted to be rotated through an arc proportional to the displacement of the weighing mechanism, a plurality of graduated dials remote for the scale, a rotatable member mounted adjacent each of said dials, an indicator carried thereby and movable over the dial and electro-magnetic means for rotating all of said rotatable members in unison.

11. In combination with a weighing scale, means for indicating at distances from the scale the weight of a load weighed upon the scale, including a rotatable member mounted adjacent the weighing mechanism of the scale, and adapted to be rotated through an arc proportional to the displacement of the weighing mechanism, a plurality of graduated dials remote from the scale, a rotatable member mounted adjacent each of said dials, an indicator carried thereby and movable over the dial, and means for rotating all of said rotatable members in unison, including electro-magnets arranged adjacent each of said rotatable members, a reciprocating member pivotally connected with the armature of each electro-magnet and arranged to engage the adjacent rotatable member, and electrical circuits adapted to be closed and opened to simultaneously energize and deënergize an electro-magnet of each dial.

12. In combination with a weighing scale, weight-transmitting means for indicating at a distance from the scale the weight of a load weighed upon the scale, comprising a rotatable member mounted adjacent the weighing mechanism of the scale and adapted to be rotated through an arc proportional to the displacement of the weighing mechanism, a pair of electro-magnets arranged adjacent said rotatable member, a pivoted armature for each of said electro-magnets, a reciprocating slide-bar pivotally connected with the free end of each armature, and respectively arranged to engage said rotatable member to move the same in opposite directions.

13. In combination with a weighing scale, weight-transmitting means for indicating at a distance from the scale the weight of a load weighed upon the scale, comprising a rotatable member mounted adjacent the weighing mechanism of the scale and adapted to be rotated through an arc proportional to the displacement of the weighing mechanism, a pair of electro-magnets arranged adjacent said rotatable member, pivoted armatures for said electro-magnets, comprising three-armed levers, a contact plate carried by one of said arms, a slide-bar pivotally connected with another of said arms and arranged to engage the rotatable member, and spring-pressed means engaging the third of the arms of said armatures arranged to swing the armatures away from the electro-magnets when the electro-magnets are deënergized.

14. In combination with a weighing scale having a metallic indicator hand, electrically-actuated weight-transmitting mechanism for indicating at a distance from the scale the weight of a load weighed upon the scale, including a rotatable member, a pair of electrical contacts on said member, a permanent magnet pivotally mounted upon said member and normally positioned in alinement with the indicator hand, said permanent magnet being arranged to engage either of said electrical contacts upon movement of the indicator hand.

15. In combination with a weighing scale having a metallic indicator hand, electrically-actuated weight-transmitting mechanism for indicating at a distance from the scale the weight of a load weighed upon the scale, including a rotatable member, a pair of electrical contacts on said member, a permanent magnet pivotally mounted upon said member and normally positioned in alinement with the indicator hand, said permanent magnet being arranged to engage either of said electrical contacts upon movement of the indicator hand, a pair of insulated contact rings carried by said rotatable member, and respectively connected with said electrical contacts, a pair of contacts slidably engaging said contact rings, a pair of electro-magnets connected respectively with said last-mentioned electrical contacts, and reciprocating members pivotally secured to the armatures of said electro-magnets and adapted to engage the rotatable member to move the same in opposite directions.

16. In combination with a weighing scale having a metallic indicator hand, electrically-actuated weight-transmitting mechanism for indicating at a distance from the scale the weight of a load weighed upon the scale, including a rotatable member, a pair of electrical contacts on said member, a permanent magnet pivotally mounted upon said member and normally positioned in alinement with the indicator hand, said permanent magnet being arranged to engage either of said electrical contacts upon movement of the indicator hand, a pair of electromagnets respectively connected with said electrical contacts, and a pair of reciprocating members pivotally secured to the armatures of said electro-magnets and adapted to engage the rotatable member to move the same in opposite directions.

17. In combination with a weighing scale having an indicator hand, means for indicating at a distance from the scale the weight of a load weighed upon the scale, including a graduated dial remote from the scale, a toothed ring rotatably mounted concentrically of said dial, an indicator carried by the toothed ring and movable over the dial, a pair of electro-magnets mounted adjacent said ring, a pair of reciprocating members pivotally connected with the armatures of said magnets, a pawl pivoted upon each of said reciprocating members and arranged to engage said toothed ring to move the same in opposite directions.

HUBERT A. MYERS.

Witnesses:
S. E. G. WHITMORE,
GEORGE R. FRYE.